(12) United States Patent
Yasuda

(10) Patent No.: US 10,443,730 B2
(45) Date of Patent: Oct. 15, 2019

(54) GASKET

(71) Applicant: Ishikawa Gasket Co., Ltd., Tokyo (JP)

(72) Inventor: Kisho Yasuda, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 0 days.

(21) Appl. No.: 16/038,379

(22) Filed: Jul. 18, 2018

(65) Prior Publication Data

US 2019/0024797 A1 Jan. 24, 2019

(30) Foreign Application Priority Data

Jul. 18, 2017 (JP) ................. 2017-138903

(51) Int. Cl.
*F16J 15/08* (2006.01)

(52) U.S. Cl.
CPC ....... *F16J 15/0818* (2013.01); *F16J 15/0825* (2013.01); *F16J 2015/085* (2013.01); *F16J 2015/0837* (2013.01); *F16J 2015/0862* (2013.01)

(58) Field of Classification Search
CPC ............. F16J 15/0825; F16J 2015/0837; F16J 2015/085; F16J 2015/0862; B32B 15/011; B32B 2581/00
See application file for complete search history.

(56) References Cited

U.S. PATENT DOCUMENTS

| 5,582,415 | A * | 12/1996 | Yoshida | ................ | F16J 15/0825 277/592 |
|---|---|---|---|---|---|
| 5,938,208 | A * | 8/1999 | Yoshida | ................ | F16J 15/0818 277/592 |
| 6,431,554 | B1 * | 8/2002 | Miyamoto | ........... | F16J 15/0825 277/593 |
| 6,508,474 | B2 * | 1/2003 | Kinoshita | ............ | F16J 15/0818 277/592 |
| 6,827,352 | B2 * | 12/2004 | Ueta | .................... | F16J 15/0825 277/592 |
| 8,267,407 | B2 * | 9/2012 | Schmucker | .......... | F16J 15/0825 277/593 |
| 2009/0189359 | A1 * | 7/2009 | Yoshijima | ............ | F16J 15/0825 277/591 |
| 2014/0265156 | A1 * | 9/2014 | Okano | ................ | F16J 15/0825 277/595 |

FOREIGN PATENT DOCUMENTS

JP 2000-097341 A 4/2000

* cited by examiner

*Primary Examiner* — Gilbert Y Lee

(74) *Attorney, Agent, or Firm* — Manabu Kanesaka

(57) ABSTRACT

A gasket includes a plurality of metal plates laminated together, and having a plurality of through holes situated adjacent to each other, and seal structures each annularly surrounding each of the through holes. Each of the seal structures includes a first seal bead adjacent to one through hole and a second seal bead situated outside the first seal bead relative to the one through hole, a first seal portion located in a first area between adjacent two through holes, and a second seal portion located in a second area other than the first area. The first seal portion has an annular width narrowing as outside ends of the first seal portion come close to a center of the first seal portion by locating the second seal bead close to the first seal bead, and the second seal portion has an annular width constant in an annular circumferential direction.

4 Claims, 6 Drawing Sheets

GASKET

BACKGROUND OF THE INVENTION AND RELATED ART STATEMENT

The present invention relates to a gasket, and more specifically, relates to the gasket which can downsize an engine.

In a gasket clamped between a cylinder head and a cylinder block, there is proposed a gasket wherein a bead's width located in an area between adjacent through holes is narrower than a bead's width located in an area other than the aforementioned area (for example, see Patent Literature 1).

PATENT LITERATURE

Japanese Patent Application Publication No. 2000-097341.

PROBLEMS TO BE SOLVED BY THE INVENTION

Incidentally, an attempt to improve fuel consumption by downsizing the engine has been carried out. Accompanied by the downsizing of the engine, the adjacent through holes come close to each other. Therefore, as described in the Patent Literature 1, it is necessary to simplify a seal structure, and to narrow the bead's width.

However, if the seal structure is simplified, there cannot be solved a problem that when a gas combustion pressure inside a cylinder increases to lift a cylinder head, a portion between the cylinder head and the cylinder block widens in a up and down direction; or a problem that when deformation is generated in the cylinder block or the cylinder head due to the influence of cooling at an operation time of the engine, a sealing surface of the gasket inclines. The aforementioned up-and-down extent, inclination on the sealing surface, or the like becomes a factor for a decline of a surface pressure at a circumferential edge of the through hole.

On the other hand, in order to solve the reduction of the surface pressure at the circumferential edge of the through hole, if the seal structure has a complicated structure in that, for example, a plurality of beads aligns in an annular radial direction, an annular width of the seal structure itself becomes wider even if there is used a technical idea of narrowing only the bead's width as is the case of the gasket described in the Patent Literature 1, and it cannot correspond to narrow the width between the adjacent through holes.

The present invention is made in view of the aforementioned problems, and an object of the present invention is to provide a gasket which allows the adjacent through holes to come close to each other to downsize the engine without declining a seal performance.

Further objects and advantages of the invention will be apparent from the following description of the invention.

SUMMARY OF THE INVENTION

In order to obtain the aforementioned object, a gasket of the present invention is formed by laminating a plurality of metal plates, and comprises a plurality of through holes aligning in one direction, and a seal structure annularly surrounding each of the through holes. In the seal structure, in a plan view, at least two seal beads align from an inside end toward an outside end of the seal structure, and a first seal portion located in an area between adjacent through holes, and a second seal portion located in an area other than the aforementioned area are disposed in an annular circumferential direction. A planar shape of the first seal portion has a shape having an annular width of narrowing as the outside end comes close to a center portion from both end portions in the annular circumferential direction, and a planar shape of the second seal portion has a shape wherein the annular width is constant in the annular circumferential direction. A cross-sectional shape of a lamination of the first seal portion has a shape wherein a cross-sectional shape of a lamination of the second seal portion is reduced only in an annular radial direction.

In the gasket of the present invention, the outside end and the inside end in the radial direction of the first seal portion located in the area between the adjacent through holes come close to each other, so that the cross-sectional shape of the lamination of the first seal portion has the shape wherein the cross-sectional shape of the lamination of the second seal portion is reduced only in the radial direction. Therefore, according to the present invention, while improving a seal performance by complicating a structure by the first seal portion and the second seal portion, the first seal portion can be narrowed by matching an area as both through holes come close to each other. Thereby, while reliably preventing the leakage of a fluid between the through holes, it becomes advantageous for allowing the adjacent through holes to come close to each other so as to downsize an engine. Accordingly, fuel consumption can be improved.

DETAILED DESCRIPTION OF PREFERRED EMBODIMENTS

Figure 1:
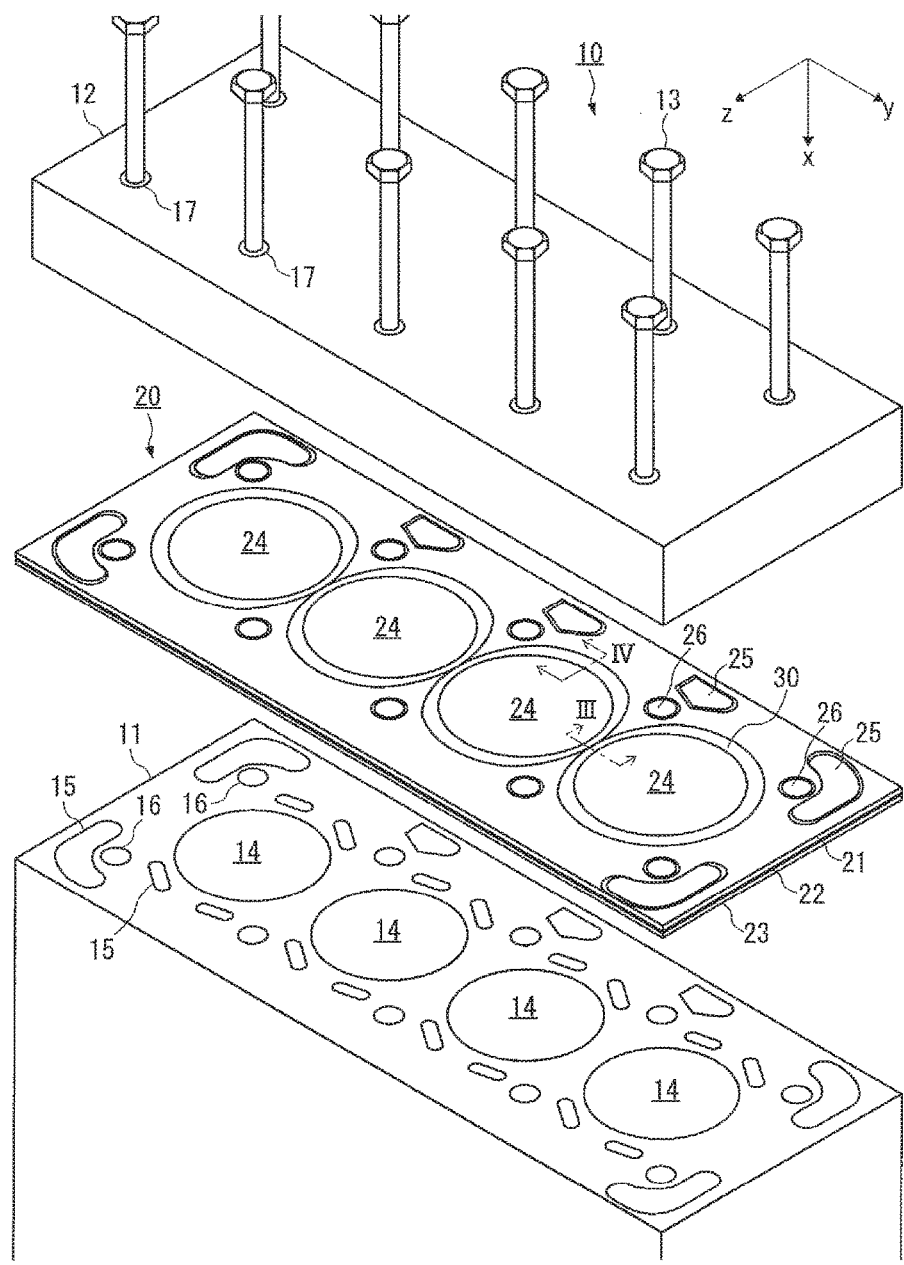
FIG. 1 is a perspective view showing the first embodiment of a gasket as an example according to the present invention.

Hereinafter, embodiments of the present invention will be explained with reference to the drawings. In the drawings, the reference alphabet x represents a vertical direction, and a thickness direction (a lamination direction) of a gasket 20; the reference alphabet y represents a direction orthogonal to the x direction, and a direction wherein cylinder bores 14 align; and the reference alphabet z represents a direction orthogonal to the x direction and the y direction. Incidentally, in FIG. 1 to FIG. 6, sizes are changed to easily understand a structure, and the sizes do not necessarily correspond to ratios of portions actually manufactured.

As shown in FIG. 1 to FIG. 4 as an example, the gasket 20 according to the first embodiment is assembled to an engine 10, and is a cylinder head gasket interposed between a cylinder block 11 and a cylinder head 12, and fastened by bolts 13.

As shown in FIG. 1 as an example, in the cylinder block 11, there are formed four cylinder bores 14 as holes to be sealed; and water and oil holes 15, such as water holes for a water jacket or oil holes for lubricating oil, formed on an outer circumference of the cylinder bores 14. Inside the cylinder bore 14, there are assembled pistons (not shown in the drawings) reciprocally in an up-and-down direction. In the cylinder block 11, there are formed four bolt holes 16 relative to one cylinder bore 14 on the outer circumference of the cylinder bore 14.

In the cylinder head 12, there are assembled injectors (not shown in the drawings) or intake-and-exhaust valves (not shown in the drawings), and bolt holes 17 corresponding to the bolt holes 16 of the cylinder block 11 pass through the cylinder head 12.

In the gasket 20, there are laminated three layers of an upper layer 21, an intermediate layer 22, and a lower layer 23 formed in this order downward in the x direction, and the gasket 20 is formed in a flat plate shape. In the gasket 20, there are formed through holes 24 to 26. The through holes 24 correspond to the cylinder bores 14, the through holes 25 correspond to the water and oil holes 15, and the through holes 26 correspond to the bolt holes 16 and 17, respectively. The through holes 24 to 26 pass through all of the layers of the upper layer 21, the intermediate layer 22, and the lower layer 23. A plurality of through holes 24 aligns in the y direction. The gasket 20 includes a plurality of seal structures 30 annularly enclosing the respective through holes 24 in a plan view.

Figure 2:
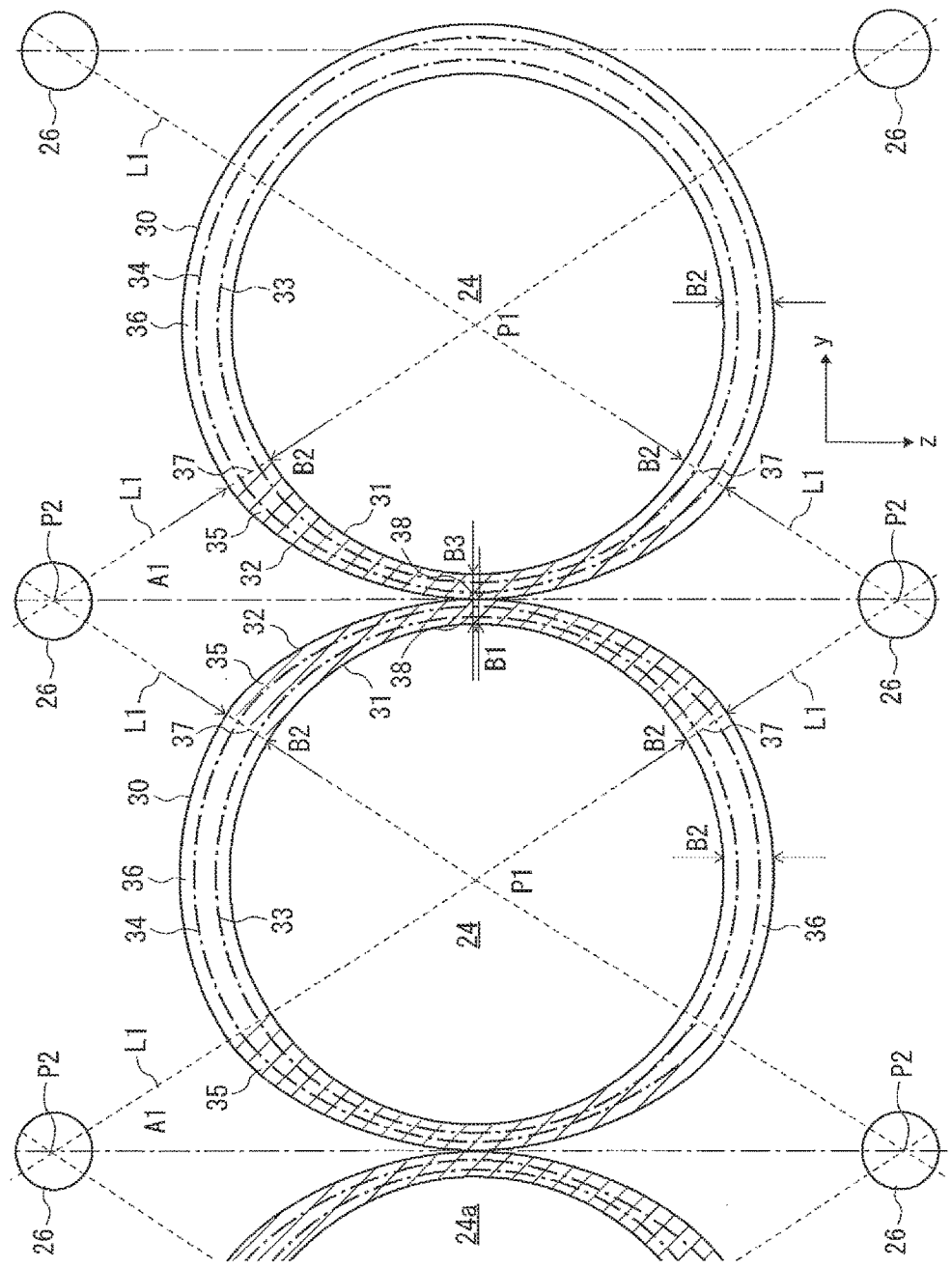
FIG. 2 is a plan view of essential parts of the gasket in FIG. 1.

As shown in FIG. 2 as an example, in the plan view, in the seal structure 30, there are aligned at least two seal beads 33 and 34 from an inside end 31 toward an outside end 32 in an annular radial direction. Also, in the plan view, the seal structure 30 is formed by alternately disposing first seal portions 35 and second seal portions 36 in an annular circumferential direction.

The inside end 31 is a circumferential edge of the through hole 24, and is formed in a circular arc shape over the whole area in the annular circumferential direction of the seal structure 30. When the gasket 20 is interposed between the cylinder block 11 and the cylinder head 12, and is fastened by the bolts 13, the outside end 32 becomes an end in the annular radial direction of a portion wherein a surface pressure becomes higher by the seal structure 30. In the outside end 32, a shape of the first seal portion 35 differs from that of the second seal portion 36.

The seal beads 33 are the beads respectively formed in the upper layer 21 and the lower layer 23, are disposed on a side of an inside end 31 of the seal structure 30, and enclose the through hole 24. The seal beads 34 are the beads respectively formed in the upper layer 21 and the lower layer 23, are disposed on a side of an outside end 32 of the seal structure 30, and enclose the through hole 24 and the seal beads 33. Detailed explanations of the seal beads 33 and 34 will be described later.

The first seal portion 35 is the portion located in a first area A1 which is the area between the adjacent through holes 24 in the seal structure 30. The second seal portion 36 is the portion located in an area other than the first area A1 in the seal structure 30.

The first area A1 is a rhombic area surrounded by a bolt shaft line L1 connecting a center P1 of the through hole 24 corresponding to the cylinder bore 14 and a center P2 of the through hole 26 corresponding to the bolt hole 16. The first area A1 is the area set based on a positional relation between the center P1 of the through hole 24 and the center P2 of the through hole 26.

Specifically, in the seal structures 30 enclosing the adjacent through holes 24 wherein the through holes 24 are located adjacent on two sides in the y direction, in the plan view, two first seal portions 35 and two second seal portions 36 are formed in the annular circumferential direction. Also, in the seal structure 30 (in the drawing, the seal structure on a right side) enclosing the through hole 24 wherein the through hole 24 is formed only one side in the y direction, in the plan view, one first seal portion 35 and one second seal portion 36 are formed to be disposed in the annular circumferential direction.

A planar shape of the first seal portion 35 has a shape such that an annular width becomes narrower as the outside end 32 comes close to the inside end 31 toward a center portion 38 from both end portions 37 in the annular circumferential direction. More specifically, in the planar shape of the first seal portion 35, the inside end 31 is formed in the circular arc shape, and the outside end 32 is formed in an oval arc shape or an arcuate arc shape that comes close to the inside end 31 as the outside end 32 comes close to the center portion 38 from both end portions 37. Namely, the planar shape of the first seal portion 35 has a shape such that the inside end 31 and the outside end 32 are positioned to be the farthest at both end portions 37, and the inside end 31 and the outside end 32 are positioned to be the closest at the center portion 38.

The annular width (a length between the inside end 31 and the outside end 32) of the first seal portion 35 becomes a minimum width B1 at the center portion 38, and becomes a maximum width B2 at both end portions 37. The minimum width B1 has half the width of a minimum separating distance B3 between the adjacent through holes 24, and the maximum width B2 has 1.5 times or more and three times or less the minimum width B1. Incidentally, in the present specification, "or more" and "or less" include a boundary value thereof.

The first seal portion 35 may change the annular width in the annular circumferential direction in a stepwise manner; however, it is preferable that the annular width thereof smoothly changes from the maximum width B2 to the minimum width B1 from both end portions 37 toward the center portion 38 in such a way so that the outside end forms an arc shape.

An arc length of the inside end 31 of the first seal portion 35 becomes shorter as a portion between both centers P2 of the through holes 26 aligning in the z direction comes closer, and a length in the z direction of the first area A1 becomes shorter. Also, the arc length of the inside end 31 of the first seal portion 35 becomes longer as the portion between both centers P2 is separated, and the length in the z direction of the first area A1 becomes longer. An oval arc length or an arcuate arc length of the outside end 32 of the first seal portion 35 is the same as well.

A planar shape of the second seal portion 36 has a shape such that the annular width which is the same as the maximum width B2 of the aforementioned both end portions 37 is constant in the annular circumferential direction. The second seal portion 36 has a circular shape, and an annular width thereof is the aforementioned maximum width B2 through the whole area in the annular circumferential direction. An arc length of a circle of the second seal portion 36 becomes longer as the portion between both centers P2 of the through holes 26 aligning in the z direction comes closer, and becomes shorter as the portion between both centers P2 of the through holes 26 is separated.

Figure 3:
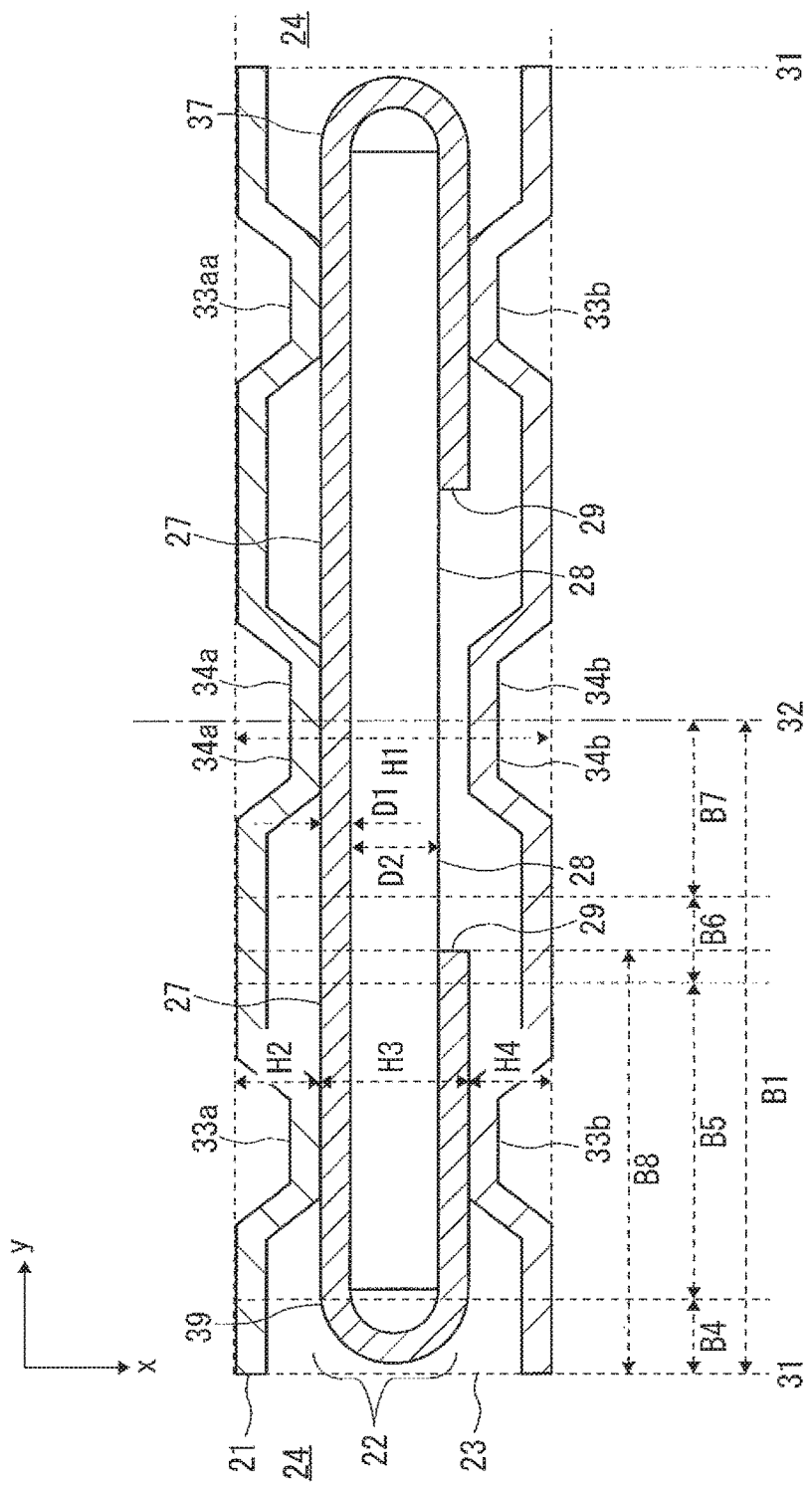
FIG. 3 is a cross-sectional view of a seal structure in a first area shown by an arrow III in FIG. 1.
Figure 4:
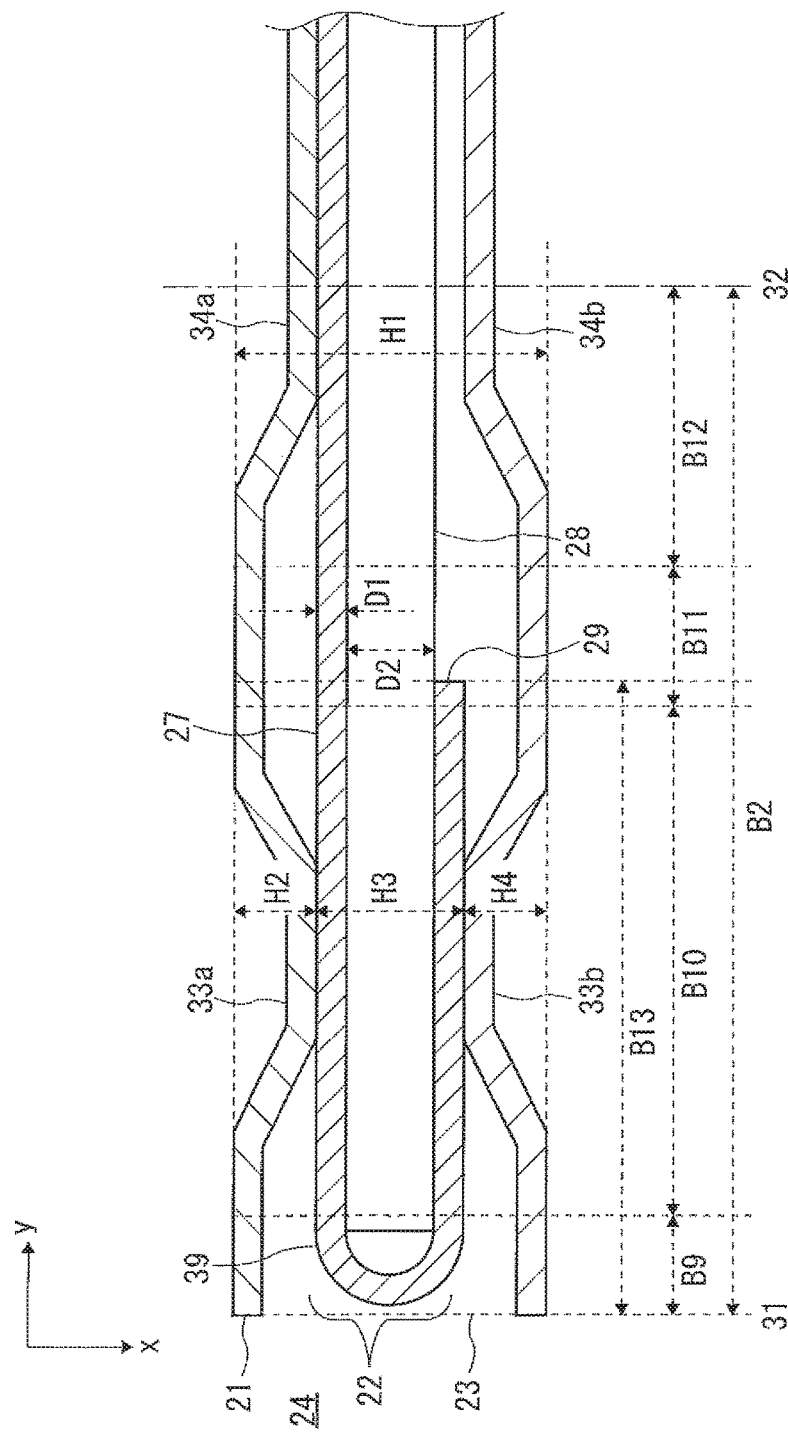
FIG. 4 is a cross-sectional view of the seal structure in a second area shown by an arrow IV in FIG. 1.

As shown in FIG. 3 and FIG. 4 as an example, the seal structure 30 has a complicated structure such that there are formed at least two seal beads 33 (33a and 33b) and 34 (34a and 34b) at both sides of the upper layer 21 and the lower layer 23, and there is formed a folded portion 39 at the intermediate layer 22.

In a cross-sectional view of a lamination, the intermediate layer 22 is formed such that two sheets of a first plate material 27 and a second plate material 28 are laminated in order downward in the x direction. As an example of metal plates forming the first plate material 27 and the second plate material 28, there can be shown a metal plate made of iron alloy such as stainless steel, steel, and the like, and the aforementioned metal plate wherein an annealing step is carried out, and the metal plates may be formed of mutually different metals as well.

The first plate material 27 is formed by one sheet of metal plate having a plate thickness D1. The second plate material 28 is formed by one sheet of metal plate having a plate thickness D2. The plate thickness D2 of the second plate material 28 is preferably thicker than twice of the thickness of the plate thickness D1 of the first plate material 27.

In the first plate material 27, there is formed the folded portion 39 such that a circumferential edge end 29 on a side of the through hole 24 is folded in such a way so as to wrap an end portion on a through hole 24 side of the second plate material 28 by bend-processing and the like. The folded portion 39 is formed in a grommet shape such that the folded first plate material 27 wraps a circumferential edge end on the through hole 24 side of the second plate material 28.

The respective upper layer 21 and lower layer 23 are formed by at least one sheet of metal plate. The upper layer 21 and the lower layer 23 may have different plate thicknesses respectively, and may be formed by a plurality of metal plates respectively. As for the metal plate forming the upper layer 21 and the lower layer 23, an elastic metal plate made of the stainless steel and the like is shown as an example.

The seal beads 33 (33a and 33b) are formed respectively in the upper layer 21 and the lower layer 23, have an annular shape in the plan view, are disposed on an inner side in the annular radial direction more than the circumferential edge end 29, and enclose the through hole 24. The seal beads 34 (34a and 34b) are formed respectively in the upper layer 21 and the lower layer 23, have the annular shape in the plan view, are disposed on an outer side in the annular radial direction more than the circumferential edge end 29, and surround both of the through hole 24 and the seal beads 33.

The seal beads 33 are formed by a full bead over the whole circumference in the annular circumferential direction. The full bead is the bead such that a top portion at a center portion in the cross-sectional view of the lamination forms a convex shape projecting in the x direction more than both end portions.

In the seal bead 33a formed in the upper layer 21, a top portion thereof protrudes downward in the x direction, and in the seal bead 33b formed in the lower layer 23, a top portion thereof protrudes upward in the x direction. Namely, the seal bead 33a and the seal bead 33b protrude in a direction of coming close to each other. Also, in the seal bead 33a, the top portion thereof contacts an upper end of the folded portion 39, and in the seal bead 33b, the top portion thereof contacts a lower end of the folded portion 39.

The seal bead 33a and the seal bead 33b align in a line in the x direction. Namely, in the seal bead 33a and the seal bead 33b, center positions thereof in the y direction that is a bead's width direction correspond.

In the embodiment, in the seal beads 33, a shape of the full bead has an isosceles trapezoid shape in the cross-sectional view of the lamination, and faces which become the respective top portions face each other in the x direction.

It is preferable that a bead's shape of the seal bead 33a and the seal bead 33b is the same except for a direction where the top portion in the cross-sectional view of the lamination protrudes, and that a bead's height and a bead's width are the same as well. Specifically, the seal bead 33a and the seal bead 33b have a vertically symmetrical shape with the intermediate layer 22 as a symmetry axis.

The seal beads 34 (34a and 34b) are formed by a half bead over the whole circumference in the annular circumferential direction. The half bead is the bead forming a step shape wherein in the cross-sectional view of the lamination, either one end portion of both end portions projects in the x direction relative to the other end portion.

In the seal bead 34a formed in the upper layer 21, an end portion on the outside end 32 side protrudes downward in the x direction relative to an end portion on the inside end 31 side. In the seal bead 34b formed in the lower layer 23, the end portion on the outside end 32 side protrudes upward in the x direction relative to the end portion on the inside end 31 side. Namely, the seal bead 34a and the seal bead 34b protrude in the direction of coming close to each other. Also, in the seal bead 34a, the top portion thereof contacts the upper end of the first plate material 27 of the intermediate layer 22, and in the seal bead 34b, the top portion thereof separates from a lower end of the second plate material 28 of the intermediate layer 22. Incidentally, when the gasket 20 is interposed between the cylinder block 11 and the cylinder head 12, and is fastened by the bolts 13, the seal bead 34b contacts the lower end of the second plate material 28.

Also, the seal bead 34a and the seal bead 34b align in a line in the x direction. Namely, in the seal bead 34a and the seal bead 34b, center positions thereof in the y direction that is the bead's width direction correspond.

In the embodiment, in the seal bead 34a and the seal bead 34b, a shape of the half bead has a "z" shape in the cross-sectional view of the lamination, and faces which become respective projecting end portions face each other in the x direction.

It is preferable that a bead's shape of the respective seal bead 34a and seal bead 34b is the same except for the direction where the top portion protrudes in the cross-sectional view of the lamination, and that the bead's height and the bead's width are the same as well. Namely, the seal bead 34a and the seal bead 34b have the vertically symmetrical shape relative to the intermediate layer 22.

As shown in FIG. 3 as an example, in the first area A1 which is an area between the adjacent through holes 24, the seal bead 34a surrounding one through hole 24 and the seal bead 34a surrounding the other through hole 24 meet. Similarly, both seal beads 34b meet.

In the embodiment, in an area including the center portion (the center portion 38 of the first seal portion 35) in the first area A1, both seal beads 34a meet to form one full bead wherein the top portion protrudes downward in the x direction. Also, both seal beads 34b meet to form one full bead wherein the top portion protrudes upward in the x direction. Namely, in the center portion in the first area A1, the outside ends 32 adjoin in the y direction, and in the cross-sectional view of the lamination, there are formed two full beads in the up-and-down direction.

A cross-sectional shape of the lamination of the first seal portion 35 of the seal structure 30 shown in FIG. 3 as an example has a shape wherein a cross-sectional shape of the lamination of the second seal portion 36 shown in FIG. 4 as an example is reduced only in the annular radial direction.

In the drawings, the reference symbol H1 represents a height of the first seal portion 35 and the second seal portion 36, the reference symbol H2 represents a height of the upper layer 21, the reference symbol H3 represents a height of the intermediate layer 22, and the reference symbol H4 represents a height of the lower layer 23, respectively.

Also, the reference symbols B4 to B8 represent widths and distances in the annular radial direction in the first seal portion 35, wherein the reference symbol B4 represents the distance from the inside end 31 to a start point of the seal bead 33; the reference symbol B5 represents the bead's width of the seal bead 33; the reference symbol B6 represents the distance between the seal bead 33 and the seal bead 34; the reference symbol B7 represents the bead's width of the seal bead 34; and the reference symbol B8 represents the folded width from the inside end 31 to the circumferential edge end 29, respectively.

The reference symbols B9 to B13 represent widths and distances in the annular radial direction in the second seal portion 36, wherein the reference symbol B9 represents the distance from the inside end 31 to the start point of the seal bead 33; the reference symbol B10 represents the bead's width of the seal bead 33; the reference symbol B11 represents the distance between the seal bead 33 and the seal bead 34; the reference symbol B12 represents the bead's width of the seal bead 34; and the reference symbol B13 represents the folded width from the inside end 31 to the circumferential edge end 29, respectively.

Compared to the cross-sectional shape of the lamination of the first seal portion 35 and the cross-sectional shape of the lamination of the second seal portion 36, the heights (H1 and H2 to H4) in the x direction are equal. On the other hand, the distances and the widths (B4 to B8) in the y direction of the first seal portion 35 are shorter than the distances and the widths (B9 to B13) in the y direction of the second seal portion 36. Also, a ratio (B4:B5:B6:B7:B8) of the distances and the widths in the y direction of the first seal portion 35 is equal to a ratio (B9:B10:B11:B12:B13) of the distances and the widths in the y direction of the second seal portion 36.

As stated above, the gasket 20 has a structure such that the outside end 32 of the first seal portion 35 located in the first area A1 comes close to the inside end 31 to form the cross-sectional shape of the lamination of the first seal portion 35 so that the cross-sectional shape of the lamination of the second seal portion 36 is reduced only in the annular radial direction. Therefore, the gasket 20 can narrow the first seal portion 35 by matching the first area A1 that becomes narrower as both through holes 24 come close to each other while improving a seal performance by complicating a structure by the first seal portion 35 and the second seal portion 36. Thereby, while reliably preventing the leakage of a fluid flowing in the through holes 24, it becomes advantageous for allowing the adjacent through holes 24 to come close to each other so as to downsize an engine. Accordingly, fuel consumption can be improved.

In the gasket 20, in the plan view, the inside end 31 in the first seal portion 35 is formed in the circular arc shape, and the outside end 32 is formed in the oval arc shape or the arcuate arc shape. Namely, the outside end 32 smoothly comes close to the inside end 31 toward the center portion 38 from both end portions 37 in the annular circumferential direction in the first seal portion 35. Therefore, rigidity of the seal beads 33 and 34, and the folded portion 39 can smoothly increases toward the center portion 38 from both end portions 37 in the annular circumferential direction in the first seal portion 35. Thereby, it becomes advantageous for compensating a surface pressure declining accompanied by that the cross-sectional shape of the lamination becomes narrower by smoothly increasing the rigidity, so that the surface pressure in the annular circumferential direction can be equalized.

The gasket 20 comprises the seal structure 30 wherein at least two seal beads 33 and 34 align from the inside end 31 toward the outside end 32. Therefore, there is a condition wherein the surface pressure at a circumferential edge of the through hole 24 declines by a head lift, and when a gas burned at the cylinder bore 14 passes through the seal bead 33 on the inner side, a combustion pressure of the gas is reduced, the gas where the pressure thereof is reduced is reliably prevented from passing through by the seal bead 34 on the outer side. Thus, the seal structure 30 is formed as the complicated structure so as to become advantageous for improving the seal performance.

Incidentally, as for the condition wherein the surface pressure at the circumferential edge of the through hole 24 declines, other than the head lift shown as an example in the embodiment, a deformation of the cylinder block 11 or the cylinder head 12 due to the influence of a decrease of heat during an operation can be stated as an example.

Also, in the gasket 20, the folded portion 39 is formed in the intermediate layer 22 so as to become advantageous for increasing the surface pressure on the side of the inside end 31 of the seal structure 30, and when the condition wherein the surface pressure of the circumferential edge of the through hole declines occurs, a decline or reduction of the surface pressure by the seal bead 33 can be effectively suppressed.

Additionally, in the gasket 20, in the first area A1 between both through holes 24, both seal beads 34 meet to form the full bead, so that even if the seal structure 30 having the complicated structure is used in the first area A1, a portion between the adjacent through holes 24 can be narrowed so as to become advantageous for downsizing the engine.

Figure 5:
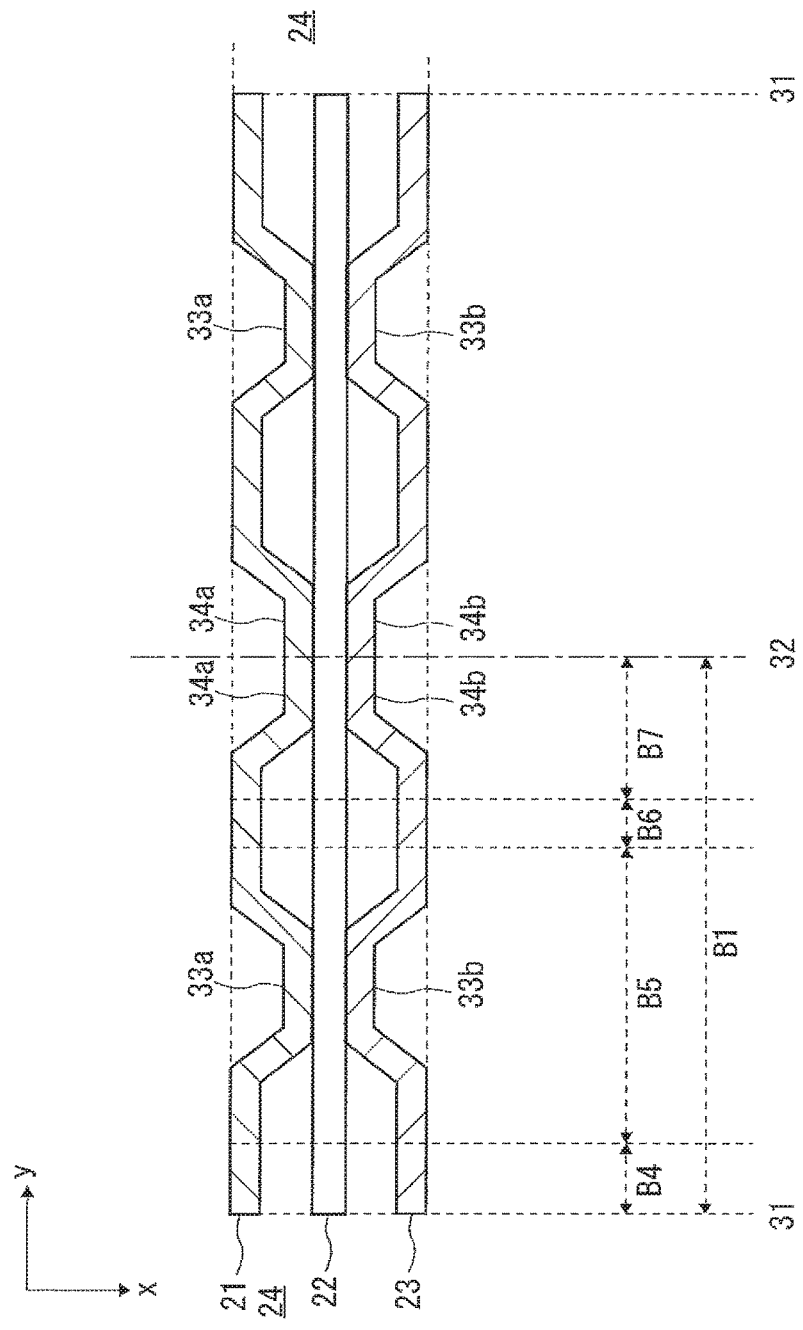
FIG. 5 is a cross-sectional view of the seal structure in the first area showing a second embodiment of the gasket as an example according to the present invention.
Figure 6:
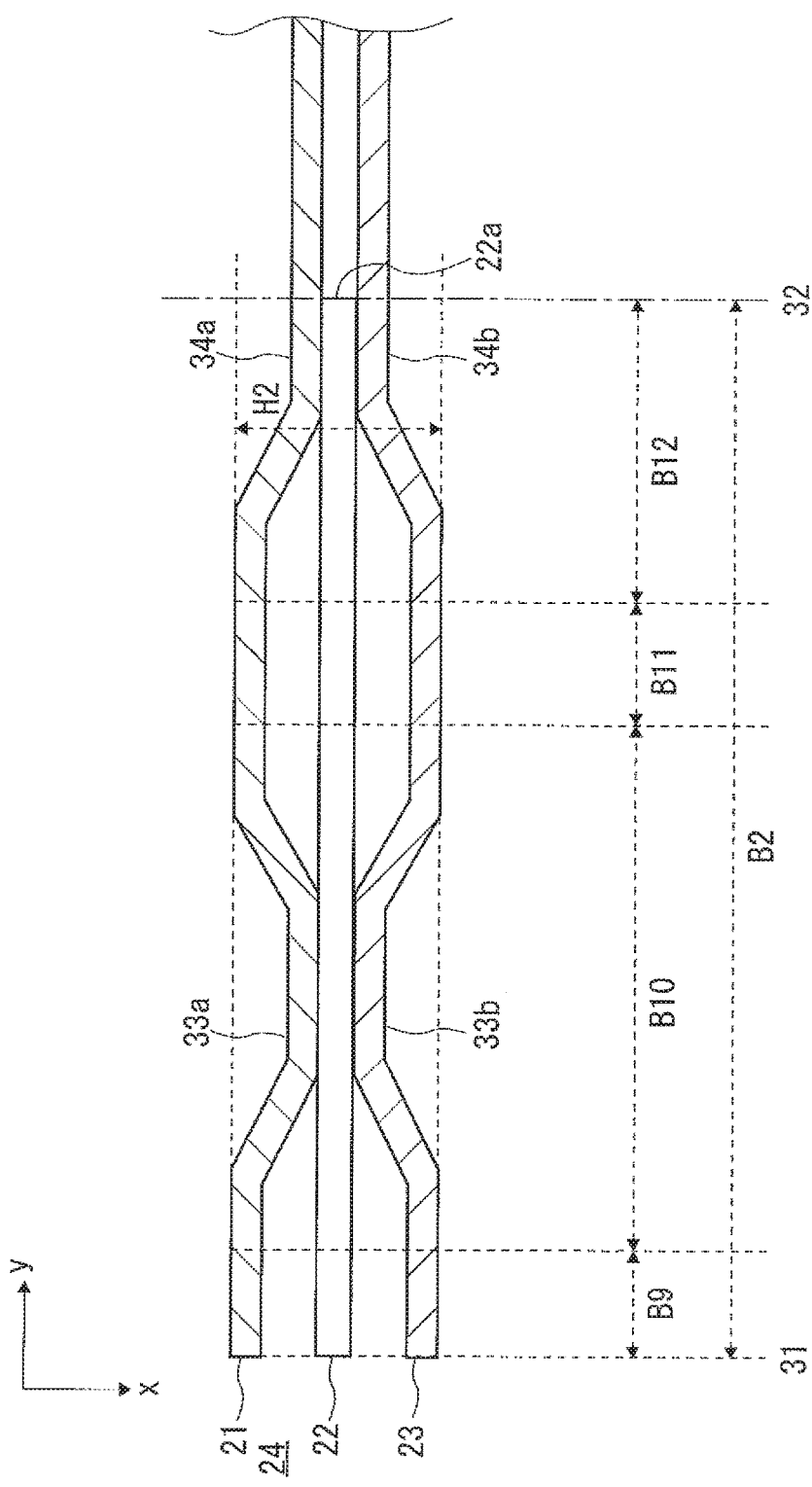
FIG. 6 is a cross-sectional view of the seal structure in the second area showing the second embodiment of the gasket as an example according to the present invention.

In the gasket 20 of a second embodiment shown in FIG. 5 and FIG. 6 as an example, a structure of the intermediate layer 22 differs from that of the first embodiment. The intermediate layer 22 of the second embodiment is formed by one sheet of shim, and the shim does not extend to an outside in the annular radial direction from the seal structure 30.

Thus, the seal structure 30 may not be provided with the folded portion provided that at least two seal beads 33 and 34 align from the inside end 31 toward the outside end 32. Also, the intermediate layer 22 may be formed by the shim provided only in the seal structure 30.

In the aforementioned embodiments, in a case wherein the through hole 25 corresponding to the water or oil hole comes close to the through hole 24, as for the through hole 25 as another through hole, and the portion between the through hole 24 and the through hole 25 as the first area A1, the first seal portion and the second seal portion may be formed in the seal structure surrounding the through hole 25.

In the aforementioned embodiments, in the intermediate layer 22, there has been explained as an example wherein the first plate material 27 is laminated on the upper side, and the second plate material 28 is laminated on the lower side; however, in the intermediate layer 22, the upper side and the lower side may be inverted. Also, in the seal bead 33, the seal bead 33a formed in the upper layer 21 may protrude upward in the x direction, and the seal bead 33b formed in the lower layer 23 may protrude downward in the x direction. In that case, the top portion of seal bead 34a formed in the upper layer 21 may protrude upward in the x direction, and the top portion of the seal bead 34b may protrude downward in the x direction.

A shape in the cross-sectional view of the lamination of the seal beads 33 and 34 is not especially limited. In a case wherein the seal beads 33 and 34 are the full bead, in the cross-sectional view of the lamination, it may form the circular arc shape or a triangle shape. Also, in a case wherein the seal beads 33 and 34 are the half bead, in the cross-sectional view of the lamination, it may form an "s" shape.

In the aforementioned embodiments, at a portion of the narrowest portion between the through holes 24, both seal beads 34 meet; however, a length of allowing both seal beads to meet may be long. Specifically, in the plan view, the full beads which meet may be linearly formed such that the full beads meeting in the z direction from the center portion 38 extend.

The disclosure of Japanese Patent Application No. 2017-138903, filed on Jul. 18, 2017, is incorporated in the application.

While the invention has been explained with reference to the specific embodiments of the invention, the explanation is illustrative and the invention is limited only by the appended claims.

What is claimed is:

1. A gasket comprising:
a plurality of metal plates laminated together, and having a plurality of through holes situated adjacent to each other, and seal structures each annularly surrounding each of the through holes,
wherein each of the seal structures includes a first seal bead adjacent to one through hole and a second seal bead situated outside the first seal bead relative to the one through hole, a first seal portion located in a first area between adjacent two through holes, and a second seal portion located in a second area other than the first area,
the first seal portion has an annular width narrowing as outside ends of the first seal portion come close to a center of the first seal portion by locating the second seal bead close to the first seal bead, and the second seal portion has an annular width constant in an annular circumferential direction, and
the first seal portion has a cross-section shape in a laminate direction same as that of the second seal portion and is reduced only in a radial direction of the one through hole.

2. A gasket according to claim 1, wherein in the first seal portion, the first seal bead has a circular arc shape, and the second seal bead has an oval arc shape or an arcuate arc shape.

3. A gasket according to claim 1, wherein the first seal portion has a minimum annular width half of a minimum separating distance between the adjacent through holes, and a maximum width 1.5 times or more and three times or less relative to the minimum width.

4. A gasket according to claim 1, wherein the first seal bead is a full bead, and the second seal bead is a half bead located on an outer side of the full bead, and in an area between adjacent through holes, a half bead surrounding one through hole and a half bead surrounding another through hole meet to form a full bead.

* * * * *